United States Patent [19]
Vogt

[11] 3,771,302
[45] Nov. 13, 1973

[54] GAUGE WHEEL MOUNTING FOR A HARVESTER

[75] Inventor: James Lee Vogt, Ottumwa, Iowa
[73] Assignee: Deere & Company, Moline, Ill.
[22] Filed: June 8, 1972
[21] Appl. No.: 260,986

[52] U.S. Cl. .................................... 56/364, 56/13.5
[51] Int. Cl. ............................................. A01d 89/00
[58] Field of Search .................. 56/364, 11.9, 13.5, 56/13.6, 13.7, 13.8, 13.9, 14.1, 14.2, 14.3, 14.4, 14.5, 14.6

[56] References Cited
UNITED STATES PATENTS

| | | | |
|---|---|---|---|
| 3,046,720 | 7/1962 | Fischer | 56/14.5 |
| 3,139,717 | 7/1964 | Fischer | 56/13.8 |
| 3,374,611 | 3/1968 | Grant | 56/16.5 |
| 3,474,605 | 10/1969 | Resetich | 56/16.4 |
| 2,818,269 | 12/1957 | Northcote et al. | 56/11.9 X |
| 3,438,182 | 6/1965 | Kessler | 56/14.9 |
| 3,060,665 | 10/1962 | Escher | 56/16.4 |
| 2,524,196 | 10/1950 | Hyman | 56/364 |

Primary Examiner—Russell R. Kinsey
Attorney—H. Vincent Harsha et al.

[57] ABSTRACT

A forage harvester has a mobile main frame with a forward vertically adjustable subframe, which carries a forward windrow pickup unit, having a transverse rotary drum-type pickup with radial fingers which raise the crop from the ground as the machine advances to deliver it rearwardly to a transverse auger, which, in turn, converges the crop and propels it rearwardly through a crop transfer opening to a feeding mechanism in the harvester subframe. The weight of the pickup unit and the subframe is partly supported on a counterbalance spring between the main frame and the subframe and partly supported on a pair of gauge wheels, which are disposed on opposite sides of the pickup drum. Each gauge wheel is connected to the pickup unit by means of a transverse torsion bar having an inner end attached to the pickup unit inwardly of the side of the unit, the outer end of the torsion bar extending through a bearing means attached to the side of the pickup unit and being connected to a forwardly extending lever arm, the forward end of which is connected to the gauge wheel, so that the weight supported by the gauge wheel torsionally deflects the torsion bar.

6 Claims, 3 Drawing Figures

GAUGE WHEEL MOUNTING FOR A HARVESTER

BACKGROUND OF THE INVENTION

This invention relates to a harvesting header, and more particularly to a windrow pickup unit for attachment to a forage harvester or the like.

A windrow pickup unit conventionally utilizes a transverse rotary pickup element having a plurality of fingers which move close to the ground to engage the crop and move upwardly and rearwardly to elevate the crop. It is well known to provide gauge wheels for such pickup units, although, heretofore, the gauge wheels have generally been mounted on forwardly extending arms having their rearward ends attached to the sides of the pickup unit. This, of course, creates considerable stress at the point of attachment of the arms, which stress is magnified by the shock loads resulting from the gauge wheels riding over uneven terrain.

SUMMARY OF THE INVENTION

According to the present invention, an improved gauge wheel means is provided for supporting at least part of the weight of a windrow pickup unit or the like. More specifically, a torsion bar is provided in the mounting structure for the gauge wheel, so that the weight of the unit supported on the gauge wheel torsionally deflects the torsion bar.

An important feature of the invention resides in the fact that the torsion bar mounting reduces the stress on the side of the unit so that a relatively light supporting structure can be utilized in the unit. Also according to the invention, the inner ends of the torsion bars are attached to those parts of the supporting structure most capable of sustaining the loads imposed by the gauge wheels.

Still another feature of the invention resides in the fact that the torsion bar in the gauge wheel mounting structure provides desirable floating action in the pickup unit. Also, the torsion bar spring in the gauge wheel mounting cooperates with the spring in the harvester header suspension system to provide good pickup gauging with desirable float characteristics.

DESCRIPTION OF THE PREFERRED EMBODIMENT

The invention is embodied in a pull-type forage harvester having a mobile main frame, indicated generally by the numeral 10, mounted on a pair of support wheels 12 and connectible to a towing tractor by means of a fore-and-aft extending draft member 14. The construction of the basic harvester is described in greater detail in U. S. Pat. No. 3,377,785, issued 16 Apr. 1968 to Kessler, also assigned to the assignee herein.

Figure 1:
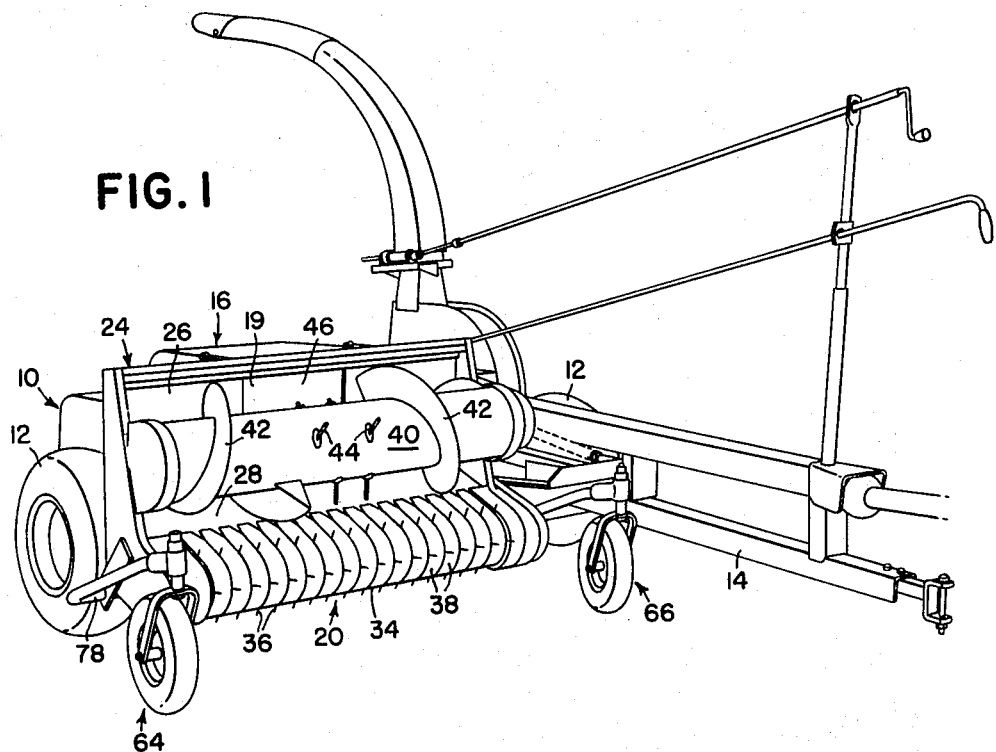
FIG. 1 is a right front perspective view of a forage harvester equipped with a windrow pickup unit including the improved mounting for the gauge wheels.
Figure 2:
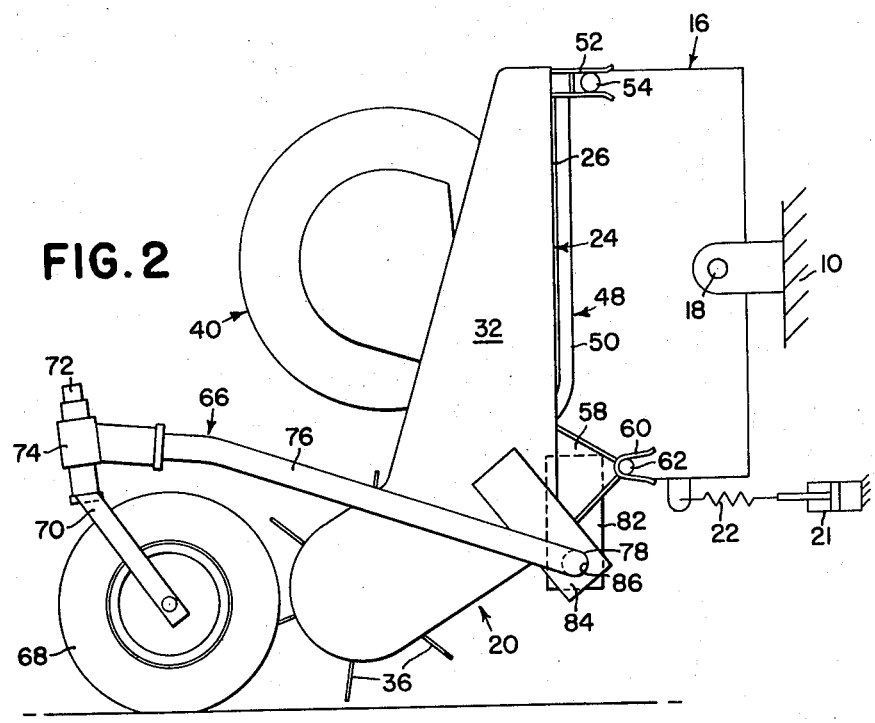
FIG. 2 is a side elevation view of the window pickup unit, including a schematic illustration of the main frame and vertically adjustable subframe on the harvester.
Figure 3:
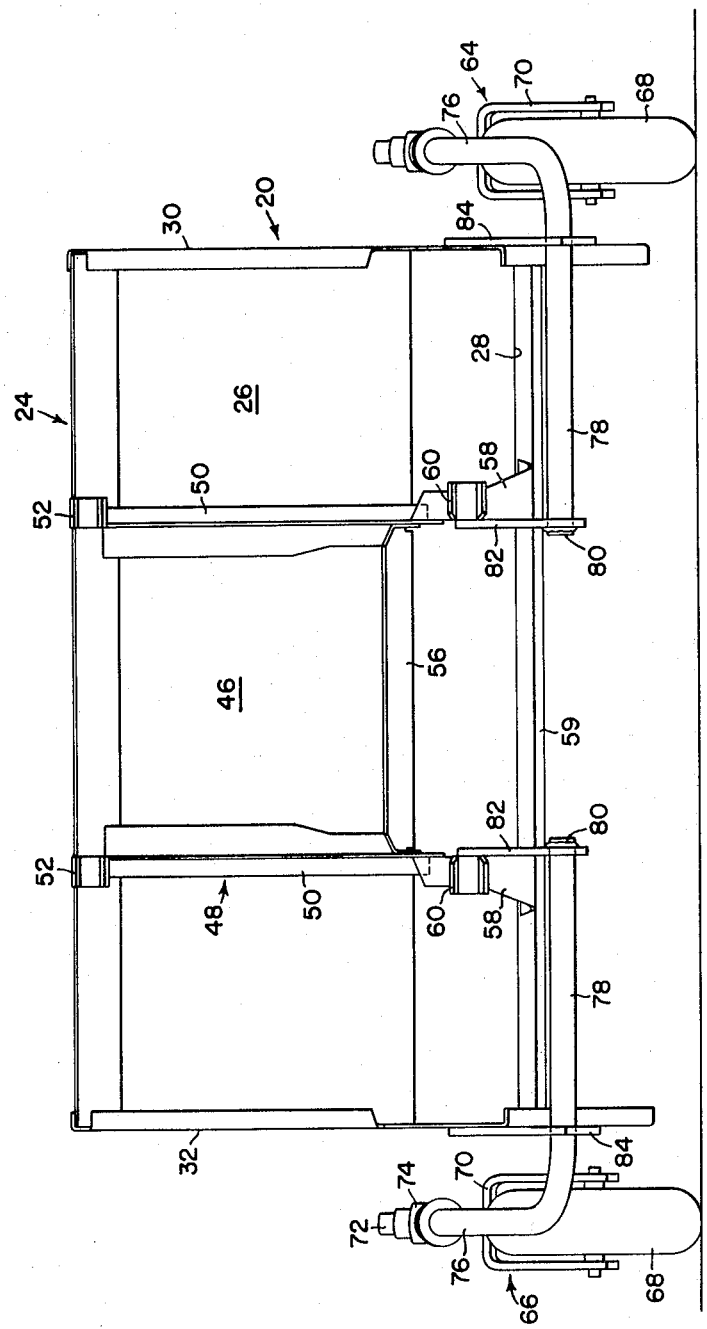
FIG. 3 is a rear elevation view of the windrow pickup unit.

The harvester has a forward subframe, indicated generally by the numeral 16, mounted on a main frame 10 by means of a transverse pivot 18, which permits vertical adjustment of the subframe. The pivot 18 is located on the axis of the cutterhead (not shown) as described in U. S. Pat. No. 3,438,182, issued 15 Apr. 1969 to Kessler, and the subframe 16 includes a forward crop inlet 19 and conventional crop feeding means for moving the crop from the inlet to the cutterhead. A harvesting header, here a windrow pickup unit 20, is mounted on the forward end of the subframe 16 in a conventional manner, so that the unit 20 is vertically adjustable about the pivot 18. The weight of the subframe and the unit 20 is at least partly supported by a series-connected cylinder 21 and compression spring 22, which operate between the main frame 10 and the subframe 16, as schematically illustrated in FIG. 2. The spring 22 provides a floating action for the windrow pickup unit 20, and the unit 20 can be raised or lowered by means of the cylinder 21.

The windrow pickup unit 20 includes a supporting structure, indicated generally by the numeral 24 and including a generally upright transversely extending rear wall 26, the lower end of which curves into a forwardly and downwardly inclined platform or bottom 28. The bottom and rear wall extend between right and left side walls 30 and 32, respectively, which are respectively disposed a substantial distance outwardly of the side walls of the subframe 16.

An axially transverse rotary dump-type pickup element 34 extends between the side walls and includes a plurality of radial fingers 36, which move between adjacent stripper plates 38 around the front and top of the pickup element, the rearward end of the stripper plates being substantially flush with the platform or bottom 28. An auger 40 extends between the opposite side walls immediately above the bottom 28 and in front of the rear wall 26 and includes oppositely wound auger flights 42 at its opposite sides for moving the crop to the center of the auger, where a number of disappearing-type auger fingers 44 engage the crop and project it rearwardly through a rectangular crop transfer opening 46 in the rear wall 26, the crop transfer opening registering with the crop inlet 19. All of the above represents more-or-less well-known windrow pickup construction.

The supporting structure 24 includes a generally upright, transversely extending attachment frame 48, which includes a pair of vertical frame members 50 on opposite sides of the transfer opening 46. A pair of transversely spaced rearwardly open sockets 52 are respectively mounted on the upper ends of the vertical members 50. As is conventional, the upper sockets 52 receive a pair of transverse pins 54 projecting outwardly from the upper forward end of the subframe 16 to releasably mount the pickup unit 20 on the subframe 16. The frame 48 also includes a transverse frame member 56 on the lower edge of the crop transfer opening 46, and a pair of lower frame members 58 extend rearwardly from the rear wall at the opposite ends of the frame member 56 and at the lower ends of the vertical frame members 50 on opposite sides of the crop transfer opening. A pair of lower, rearwardly open sockets 60 are respectively connected to the lower frame members 58 and receive pins 62 projecting laterally from the lower forward end of the subframe 16, the pins 62 being lockable on the sockets 60 to complete the removable connection of the pickup unit 20 on the subframe 16. Separable drive means (not shown) are also provided between the subframe and the pickup unit, and drives are provided in the conventional manner for the auger 40 and the rotating pickup element 34 in the left side wall 32.

Right and left gauge wheel structures 64 and 66 are respectively connected to the windrow pickup unit 20 and are generally disposed on opposite sides of the pickup unit to support part of the weight of the pickup unit and the subframe 16 a predetermined distance above the ground, when the pickup unit is lowered into operating position. Since the gauge wheel structures 64 and 66 are identical, except for the fact that they are mirror images of one another, only the left-hand gauge wheel structure will be described in detail.

The gauge wheel structure 66 includes a ground-engaging wheel 68 rotatably carried by a yoke 70 having a pivot shaft 72 at its upper end, the pivot shaft 72 being received in a generally vertical socket 74 mounted on the forward end of a fore-and-aft extending lever arm 76, which extends alongside the left side wall 32. As is apparent, the gauge wheel structures 64 and 66 provide castor-type wheels, which are disposed slightly ahead of the opposite ends of the pickup element 34.

The rearward end of the arm 76 is connected to the outer end of a transversely extending torsion bar 78, which has its inner end 80 welded to a bracket or plate 82 depending from the plate 58. In the illustrated embodiment, the torsion bar 78 and the arm 76 are formed by a single tubular member, which is provided with a 90° bend at the point of connection of the torsion bar and the arm, although, obviously, the torsion bar and the arm could be made of separate, connected members. The torsion bar 78 extends laterally outwardly from its inner end rearwardly of and below the rear wall 26 through a bearing plate or bracket 84 attached to and extending downwardly and rearwardly from the side wall 32. The bearing plate 84 is provided with a bore 86 slightly larger than the diameter of the torsion bar, so that the outer end of the torsion bar is free to rotate in the bearing plate 84.

As is apparent, in operation, the pickup unit 20 and the subframe 16 are simultaneously supported by the harvester's float spring 22 and the gauge wheel structures 64 and 66, and the portion of the weight supported on the gauge wheel structures exerts a twisting force on the torsion bars 78. Preferably, the yoke 70 is adjustable in the socket 74 to permit adjustment of the height of the pickup fingers, which normally move relatively close to the ground to pick up the crop as the machine advances. When a gauge wheel engages a hump on the ground, the torsion bar 78 will wind up slightly due to the inertia of the pickup unit and the subframe, although the added force exerted by the torsion bar as a result of the windup will immediately cause the pickup unit to raise and move the pickup element over the hump. Thus, the torsion bar absorbs the shock loads as a result of the machine moving over irregular terrain, to provide, in conjunction with the main float spring 22, a relatively soft flotation of the pickup unit. As is also apparent, only a radial load is opposed at the opposite side walls of the pickup unit through the bearing plates or brackets 84, while the major load is felt as torsion on the inner brackets or plates 82, which are connected to the relatively substantial attachment frame 48, which is able to absorb the load.

I claim:

1. In a harvester having a mobile main frame and a harvesting header adapted to remove the crop from the field as the harvester advances and including a supporting structure having opposite lateral sides and a pair of transversely spaced frame members respectively disposed inwardly from the opposite sides of the supporting structure, the improvement comprising: a pair of gauge wheel means disposed on opposite sides of the header and operatively connected to the supporting structure for supporting at least part of the weight of the harvesting header and including a pair of bearing means respectively mounted on the opposite lateral sides of the supporting structure, a pair of bracket members respectively connected to the frame members, a pair of transverse torsion bars respectively having their inner ends attached to the respective bracket members a substantial distance inwardly of the supporting structure sides, the torsion bars extending laterally outwardly through the respective bearing means, a generally fore-and-aft arm connected to the outer end of each torsion bar, a pair of ground-engaging wheels, and means respectively mounting the wheels on the arms axially parallel and offset from the torsion bars, so that the weight of the harvesting header exerts a twisting stress in the torsion bars.

2. In a forage harvester having a mobile main frame and a vertically adjustable subframe having a crop inlet opening and carrying a forward crop pickup device including a supporting structure having opposite sides and a rear wall with the crop transfer opening communicating with the crop inlet opening, an attachment frame on the rear wall and including a pair of frame members on opposite sides of the crop transfer opening, and opposite upright sidewalls, and a crop pickup element adapted to lift the crop from the ground and deliver it upwardly and rearwardly, the improvement comprising: a pair of bracket members respectively attached to the opposite sidewalls; a pair of bearing means respectively mounted on the bracket members; a pair of laterally extending torsion bars respectively having their inner ends rigidly connected to the respective frame members and extending laterally outwardly through the bearing means, the outer ends of the torsion bars being disposed outwardly of the respective sidewalls; a pair of lever arms respectively extending forwardly from the outer ends of the torsion bars; a pair of ground-engaging wheels; and means respectively mounting the wheels on the forward ends of the lever arms on opposite sides of the pickup element, so that the wheels support at least part of the weight of the subframe and pickup device, which exert a torsional stress in the torsion bars.

3. In a harvester having a mobile main frame supported on main ground-engaging wheels and a harvesting header adapted to engage the crop as the harvester advances and including a supporting structure having opposite lateral sides and a rigid frame member disposed inwardly a substantial distance from said sides, the combination therewith of improved gauge wheel means operatively connected to the supporting structure for supporting at least part of the weight of the header and comprising: a bearing means mounted on the supporting structure adjacent one of said sides; a transverse torsion bar having its inner end rigidly and nonrotatably connected to the frame member and extending laterally outwardly through the bearing means; a generally fore-and-aft arm connected to the outer end of the torsion bar; a ground-engaging wheel; and means mounting the wheel on the arm axially parallel to the torsion bar, so that the weight of the header supported by the gauge wheel means exerts a twisting stress in the torsion bar.

4. The invention defined in claim 1 wherein the supporting structure includes an upright rear wall with a crop transfer opening registering with a crop inlet on the harvester, and the torsion bars extend laterally and rearwardly of the rear wall.

5. The invention defined in claim 4 wherein the header includes a transversely extending crop pickup element, the fore-and-aft arms having their rearward ends attached to the torsion bars and the forward end connected to the wheel mounting means so that the wheels are disposed forwardly of the pickup element.

6. The invention defined in claim 2 and including a spring means operative between the main frame and the subframe for supporting the weight of the subframe and pickup device not supported by the gauge wheels.

* * * * *